United States Patent
Ben-Dor et al.

(10) Patent No.: US 10,229,495 B2
(45) Date of Patent: Mar. 12, 2019

(54) METHOD FOR UNSUPERVISED STAIN SEPARATION IN PATHOLOGICAL WHOLE SLIDE IMAGES

(71) Applicant: Agilent Technologies, Inc., Santa Clara, CA (US)

(72) Inventors: Amir Ben-Dor, Kfar (IL); Elad Arbel, Tel-Aviv (IL)

(73) Assignee: Agilent Technologies, Inc., Santa Clara, CA (US)

(*) Notice: Subject to any disclaimer, the term of this patent is extended or adjusted under 35 U.S.C. 154(b) by 88 days.

(21) Appl. No.: 15/359,470

(22) Filed: Nov. 22, 2016

(65) Prior Publication Data
US 2018/0144464 A1    May 24, 2018

(51) Int. Cl.
   G06K 9/00   (2006.01)
   G06T 7/00   (2017.01)

(52) U.S. Cl.
   CPC .......... G06T 7/0012 (2013.01); G06T 7/0081 (2013.01); G06T 2207/10024 (2013.01); G06T 2207/10056 (2013.01); G06T 2207/30024 (2013.01)

(58) Field of Classification Search
   CPC ............................................ G06T 2207/10056
   See application file for complete search history.

(56) References Cited

U.S. PATENT DOCUMENTS

| | | | | |
|---|---|---|---|---|
| 2002/0196964 A1* | 12/2002 | Stone | .................. | A61B 5/0059 382/128 |
| 2003/0175720 A1* | 9/2003 | Bozinov | ............... | C12Q 1/6837 506/9 |
| 2007/0053573 A1* | 3/2007 | Rabinovich | ........ | G06K 9/00127 382/133 |
| 2009/0044714 A1* | 2/2009 | Bae | ..................... | G06K 9/00281 101/485 |
| 2014/0023259 A1 | 1/2014 | Liu et al. | | |
| 2016/0098590 A1* | 4/2016 | Bredno | .............. | G06K 9/00127 382/133 |

FOREIGN PATENT DOCUMENTS

WO    2016/120441 A2    8/2016

OTHER PUBLICATIONS

International Search Report dated Jan. 8, 2018, PCT/US2017/052717.

(Continued)

*Primary Examiner* — Oneal R Mistry

(57) ABSTRACT

A method of operating a data processing system to automatically process a color digital image of a specimen that has been stained with a first dye and a second different dye is disclosed. The method includes receiving a color image that includes a plurality of pixels, each pixel being characterized by a pixel vector having components determined by the intensity of light in each of a corresponding number of wavelength bands. A plurality of pixel vectors of the image are transformed to a hue space divided into a plurality of bins, each bin being characterized by a number of pixels that have been transformed into that bin. The data processing system automatically finds first and second color vectors characterizing the first and second dyes, respectively based on the number of pixels that were transformed into each of the bins.

20 Claims, 2 Drawing Sheets

(56) References Cited

OTHER PUBLICATIONS

Bigras, Color Deconvolution; Optimizing Handling of 3D Unitary Opitcal Density Vectors with Polar Coordinates, Analytical and Quantitative Cytology Histology, pp. 149-160,Science Printers and Publishers, Inc., Edmonton Alberta, Canada, vol. 34, No. 3, Jun. 2012.

* cited by examiner

METHOD FOR UNSUPERVISED STAIN SEPARATION IN PATHOLOGICAL WHOLE SLIDE IMAGES

BACKGROUND

In anatomical pathology, thin tissue sections are mounted on microscope slides, and stained with a combination of stains. Each stain has a characteristic hue (e.g., Hemotoxylin is blue-purple., Eosin is red-pink, DAB is brown), and is used to visualize a particular cellular component or biomarker. A plurality of stains, each with its own color, is often used on the same slide. The slide is typically imaged with a camera or scanner that provides red, blue, and green intensities for each pixel in the image. Each pixel represents a corresponding location on the slide.

One goal of automated processing of such slides measure the intensity of each dye at each location in the slide by using the "known" color pattern of each dye in terms of intensities of red, green, and blue light emitted by that dye. The resultant pixel values define a vector in a three-dimensional space whose axes are the intensities in red, green, and blue color bands. To simplify the following discussion, two pixels whose color vectors can be made equal to one another by multiplying each of the components of one of the color vectors by a constant will be defined to have the same hue. Each stain gives rise to pixels having similar hues. Unfortunately, the stain hues are known to vary between slides for the commonly used dyes.

To correct for this variation, a calibration step in which similar tissue sections are singly stained with each stain, and visualized to determine the pure spectra of each stain are used. However, in addition to the additional labor, this type of calibration procedure presents challenges if the individual stains interact with one another so as to produce a spectrum shift in the region of overlap.

SUMMARY

The present invention includes a method of operating a data processing system to automatically process a color digital image of a specimen that has been stained with a first dye and a second different dye. The method includes receiving a color image that includes a plurality of pixels, each pixel being characterized by a pixel vector having components determined by the intensity of light in each of a corresponding number of wavelength bands. A plurality of pixel vectors of the image are transformed to a hue space divided into a plurality of bins, each bin being characterized by a number of pixels that have been transformed into that bin. The data processing system automatically finds first and second color vectors characterizing the first and second dyes, respectively, based on the number of pixels that were transformed into each of the bins.

In one aspect of the invention the number of bins is less than $10^4$. In another aspect, the number of bins is less than $10^6$.

In a further aspect, the number of pixels transformed includes substantially all of the color digital image. In another aspect, the plurality of pixels are from a sub-region of the color digital image. In a further aspect, the plurality of pixels are chosen at random from the color digital image.

In another aspect, transforming the plurality of pixel vectors includes using a transformation matrix that assigns a corresponding one of the bins to each possible pixel vector.

In a still further aspect, the relative concentration of each of the dyes in a point on the specimen utilizing the first and second color vectors is determined.

In another aspect, the data processing system utilizes a threshold value in finding the first and second color vectors and wherein the threshold is set by a user of the data processing system.

In another aspect, the data processing system displays information about the first and second colors to the user for approval by the user.

In a further aspect, the data processing system utilizes a predetermined region of the hue space in finding the first color vector.

DETAILED DESCRIPTION

Figure 1:
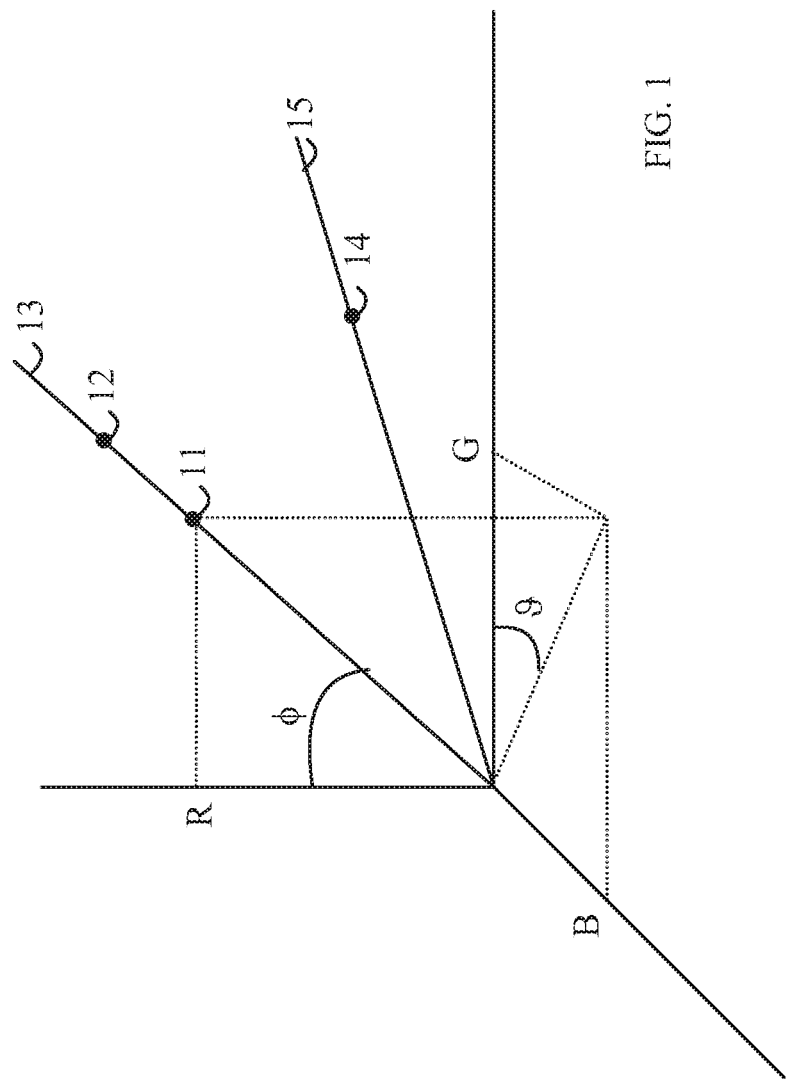
FIG. 1 illustrates some exemplary pixels in a three-dimensional space.

To simplify the following discussion, a color imaging system in which each pixel is represented by a vector whose components are the intensity in three color bands, RGB, will be used. The representation in this three-dimensional space will be referred to as the pixel space. Each pixel in a color image is represented by a point in the color space. The manner in which the present invention can be adapted to other "color" systems will be discussed below. Each pixel can be characterized as having an intensity and a hue that does not depend on the amplitude but characterizes the color of the pixel. Refer now to FIG. 1, which illustrates some exemplary pixels in a three-dimensional space. Pixels 11 and 12 lie on the same line 13 through the origin of the space, and hence, have the same hue but different amplitudes. Pixel 14 has a different hue, since it lies on a different line 15. The intensity of each pixel is proportional to the length of the line from the origin to that pixel. The hue of the pixel is determined by the direction of the vector from the origin to the pixel. The hue can be represented by the angles $\theta$ and $\phi$ or some other pair of angles. To simplify the following discussion the angles $\phi$ and $\theta$ will be used in the following discussion. However, other angles or functions of these angles could be used provided the representation could be used to determine $\theta$ and $\phi$.

One goal of the present invention is to determine the hue corresponding to each of the dyes used to stain the tissue on the slide without using a separate calibration to determine the hue. In principle, this could be accomplished by identifying pixels that correspond to locations in the specimen that were stained by a particular dye. Since the pixels in the RGB space include information about both the intensity and hue of the pixels, determining such clusters of pixels presents significant challenges particularly in whole slide images whose images can include $10^{10}$ pixels.

Figure 2:
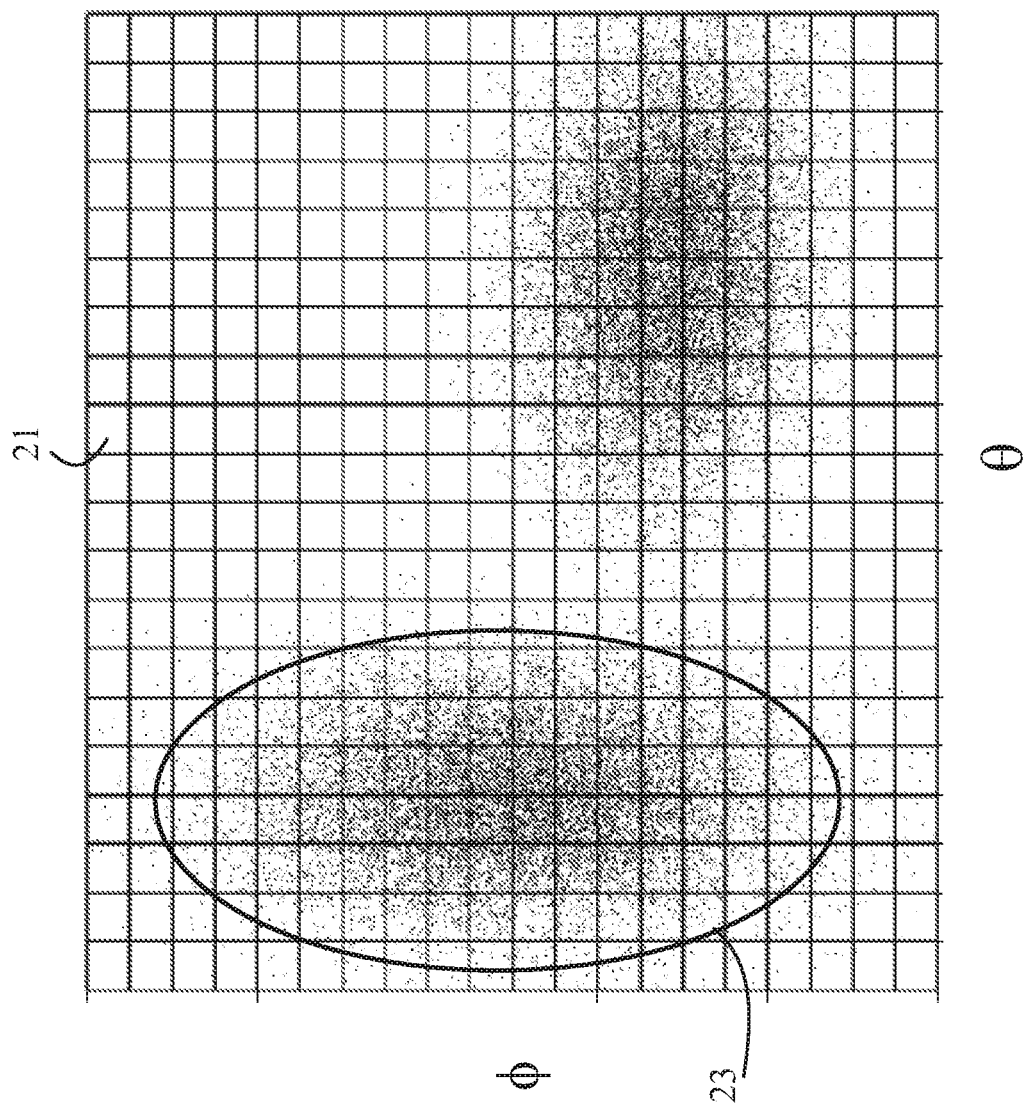
FIG. 2 illustrates an exemplary hue space according to one embodiment of the present invention.

The present invention uses two observations to overcome these challenges. First, the problems associated with dealing with both the intensity and hue of the pixels can be significantly reduced by transforming the points in the pixel space to a space in which each pixel is represented by a point that only depends on the hue of that pixel. That is, two points in the pixel space that have the same hue but different intensities are mapped to the same point in the two-dimensional hue space. One method for constructing such a hue space is to map each pixel in the pixel space to a point characterized by the angles θ and φ discussed above in the hue space. Refer now to FIG. 2, which illustrates an exemplary hue space according to one embodiment of the present invention. The axes of the space are the angles φ and θ discussed above. The different dyes are clustered in the hue space. One of the goals of the automatic processing system is to identify a point within a cluster corresponding to a particular dye that provides a calibration for the hue of that dye. Given such a point, a unit vector having the identified φ and θ values can be defined in the color space.

Denote the color vector corresponding to a dye, D, by $C_D$. Assume the slide has been stained with two dyes, $D_1$ and $D_2$. Then a pixel corresponding to a point on the slide that has a combination of the dyes can be represented by $$I_p = I_{p1} C_{D1} + I_{p2} C_{D2}, \quad (1)$$

where $I_p$ is the measured RGB vector for the pixel in question, $C_{D1}$ is the unit vector associated with the first dye, and $C_{D2}$ is the unit vector associated with the second dye. If the pixel comes from a point on the specimen that has a mixture of the two dyes in question, and there is no noise in the system, Eq. (1) would be a good fit to $I_p$ and the coefficients, $I_{p1}$ and $I_{p2}$ would provide a measure of the concentration of each dye in the specimen at the point corresponding to pixel p.

To use such an automatic self-calibrating system, the image must have sufficient pixels in each color to allow a cluster to be generated that is above the background noise. Specific fields of view in a whole slide image may lack significant areas that are stained with one of the dyes. Hence, it is advantageous to process the entire whole slide image at once.

Clustering algorithms for addressing this problem are known to the art. A cluster is defined to be a region of a space having a higher density of points than the surrounding region. Ideally, the different clusters are separated in space; however, regions in which the clusters overlap are possible. The prior art techniques present challenges when applied to an image of the sizes contemplated here. Typically, these prior art techniques determine the densities of points in a region of space by counting the number of points within some cutoff distance of each existing point. This type of procedure requires that the distance between each pair of points in the set of points be determined. The computational workload for this type of procedure is of the order $N^2$ for a space with N points defined in it. A single field of view in a microscope can have millions of pixels. A whole slide image can have $10^{10}$ pixels. A computational engine that can perform $10^{20}$ distance calculations is economically unattractive for conventional pathology laboratories.

The present invention overcomes this computational property by first dividing the hue space into an array of "bins". A typical bin is labeled at 21 in FIG. 2. The boundary of a cluster of hue values corresponding to one dye is illustrated at 23. In one exemplary embodiment, an array of 100×100 bins is used. The bins have equal size and are labeled with two indices, (i,j). The width of the bins is denoted by dφ and the height of the bins by dθ. The mapping from the angles to the corresponding indices is accomplished by dividing θ by dθ and φ by dφ, and taking the integer parts of the results. Here, dφ=90/100 and dθ is 90/100, since the pixels in the pixel space are restrained to positive values in each of the color components. The maximum number of useful bins is determined by the variations in the color vectors. If the number of bins is too small, the quantization errors introduced by binning the θ and φ angles reduces the accuracy with which the dye hues can be determined. If the number of bins is too large, the computational workload increases with no significant increase in the determination of the hue of the dies.

For any given dye combination, there is some range of θ and φ values that are actually realized in a slide. Hence, in one aspect of the invention, the ranges of θ and φ values in the image are first determined and then that range is divided into bins.

In one aspect of the present invention, the transformation from pixel space to hue space is mediated by a large table which maps each possible RGB value in the pixel space to the indices of the bin in the hue space that contains the θ and φ values for that pixel. This table will be referred to as the pixel mapping table in the following discussion. Typically, color images use 8 bits for each color channel. That is, the intensity of light in each color band is represented by an 8-bit integer. Hence, a table of all possible RGB values has approximate 16 million entries and each entry can be accessed by specifying the 24 bits of its RGB vector components. The entries in the pixel mapping table are a pair of integers that provides the indices of the bin into which that RGB value is mapped in the hue space. Hence, the table has a size of the order of 30 million bytes that is easily accommodated in most general purpose desktop computers.

It is also useful to define a second table that includes the information on the bins in the hue space. This table will be referred to as the bin table in the following discussion. This table is indexed h the indices provided by the pixel table and contains a word for holding the count of the number of pixels that have been mapped into that bin and another optional word that provides a label that identifies the dye to which that bin has been assigned. The use of this label will be discussed in more detail below.

Initially, the counts in the bin table are all initialized to zero and the labels are initialized to a predetermined value. The transformation is performed visiting each pixel in the image, indexing the pixel mapping table using that pixel's RGB values, and then incrementing the count in the bin table defined by the indices returned from the pixel mapping table. The computational workload in transforming the image to the bin counts is of order N, where N is the number of pixels in the image. This computational workload is within the capabilities of conventional desktop workstations. In addition, the computation can be performed in parallel, and hence, the time can be reduced further by using the multiple cores in conventional processors in parallel.

The next phase of the processing determines the location of the bins that are associated with each of the dyes using the counts in the bins. It is assumed that each dye gives rise to a cluster of bins in the hue space. It should be noted that the count in each bin is proportional to the average density of the pixels having hues in that bin. Hence, the bin counts can be viewed as a two-dimensional density function in the hue space. Algorithms for finding clusters given such a two-dimensional density function will be discussed below.

Before searching for clusters in the hue space, any significant distortions introduced by the pixel space to the hue space transformation should be removed. Consider a uniformly populated RGB pixel space. The density function in the RGB space is constant. That is, the number of pixels with a particular RGB value is the same as the number of pixels with any other RGB value. When these RGB values are transformed into the hue space, the resultant density distribution is not constant because of the non-linearity of the transformation being used. This distortion can alter the locations of the clusters in the hue space and/or mask small clusters, particularly in the presence of noise. Accordingly, in one aspect of the invention the density distribution in the hue space is corrected for distortions introduced by the transformation before a cluster detection algorithm is applied to the hue density function.

The distortions introduced by the transformation from the pixel space to the hue space can be measured by generating a density function corresponding to a uniformly populated RGB space. As noted above, the preferred method of performing the transformation uses a transformation table that maps each possible RGB value to a corresponding bin in the hue space. A calibration distribution can be generated by assuming an image that has one pixel at each of the possible RGB values and transforming that image. This is equivalent to stepping through the mapping table and summing all of the bin entries. In the case of a 24-bit color space and a 100×100 density function histogram, this histogram will be referred to as the calibration histogram. The calibration historam will contain approximately 16 million points. If there were no distortions, each bin would contain the same count.

A correction table can be generated from this calibration table. Then given a two-dimensional density function generated by a real image, each bin in the two-dimensional density function is divided by the corresponding bin in the correction table. The correction table can be generated by the following procedure.

The calibration histogram may contain bins with zero counts. This indicates that no color in the color space will ever be mapped to such a bin. Accordingly, there will also be a zero in the corresponding bin in the hue space. For the non-zero bins in the calibration histogram, divide the corresponding bin in the hue space by the value in the calibration histogram to obtain the corrected density function. It should be noted that corrected density distribution can be multiplied by any factor without altering the clustering procedure outcome.

Once the density function is obtained, the regions corresponding to the various dyes must be ascertained. More particularly, a color vector corresponding to each dye must be determined. These color vectors are then used to "unmix" the pixels to determine the contribution of each dye to each pixel. The manner in which the colors are unmixed will be discussed in more detail below.

The color vector that represents each color can be determined by a number of different algorithms. In one exemplary embodiment, the color vectors are determined from the density function as follows. Denote the density function value for the bin at index $(i,j)$ $i^{th}$ bin by $W_{i,j}$. First, define a distance function, $f(i,j,i',j')$, that measures the distance between bins with indices $(i,j)$ and $(i',j')$. In one exemplary embodiment, this distance is the normal Euclidian distance in the hue space, namely, $$f(i,j,i',j') = \sqrt{(i-i')^2 + (j-j')^2} \qquad (2)$$

In another exemplary embodiment, the distance function is the angle between the vectors in the color space that corresponds to colors that are mapped into the two bins in question.

Second, define a threshold value, $t_1$. The representative color for each dye is then determined as follows: Compute a summed density value $D_{i,j}$ for each bin by summing the weights, $W_{i',j'}$ for all bins $(i',j')$ that are within $t_1$ of element $(i,j)$. Next, for each bin, $(i,j)$, determine the closest bin to that element such that $D_{i',j'} > D_{i,j}$. Denote this element by NDN $(i,j)$, and the distance between $(i,j)$ and $NDN(i,j)$ by $M(i,j)$. The cluster "centers" that represent the color vectors that characterize each dye are characterized by having both a high value of D and a high value of M. That is, the cluster center is dense and far from a denser point. In one aspect of the invention, a score, $S(i,j)$ is computed for each bin according to the formula $S(i,j) = D_{i,j} * NDN(i,j)$. The bins for which $S(i,j)$ is greater than a second threshold value, $t_2$, correspond to the cluster centers used to define the color vectors for unmixing the dyes. Alternatively, if there are K dyes, the K bins corresponding to the K largest $S(i,j)$ can be selected.

The values of the thresholds, $t_1$ and $t_2$, can be preset or supplied by a user of the system. For a particular set of dyes, a preset threshold may be used. Alternatively, the user can provide the thresholds and the data processing system can provide information as to the cluster centers that were found using those thresholds. For example, if the thresholds are too low, more cluster centers may be found. The extra centers could be related to noise or other minor peaks in the hue space density distribution. Alternatively, if the thresholds are set too high, a cluster center for one of the dyes may not be found. Hence, the user can adjust the thresholds until the resultant cluster centers are consistent with known properties and variations in hue associated with the dyes in question.

The above-described procedure does not assume anything about the location of the cluster centers corresponding to a particular dye. However, if the dye is known, then there is some region of the hue space in which its color vector would be expected to be found. While the color vector for any given dye varies from preparation to preparation, there are limits to that variation, and hence, a corresponding region of the hue space can be defined. For example, a red dye would be expected to be found in the red region of the hue space. In this case, the bin in that region that has the highest $S(i,j)$ can be assigned as the color vector associated with that dye.

It should be noted that the above-described embodiments do not require that the bins other than those selected be identified as belonging to any particular cluster. However, embodiments in which the bins are assigned to clusters can also be utilized. In another exemplary embodiment for determining the color vectors corresponding to each dye, an array having the same size as the array of bins is initialized to a value indicating that the corresponding bin has not yet been assigned to a particular dye. The labels reserved in the bin table can be used for this purpose.

The maximum bin among the bins that have not been assigned is then located and assigned to the next dye, referred to as the current dye. This maximum is assumed to be the peak corresponding to the current dye. The remaining bins corresponding to that dye can be found by checking each non-assigned and non-visited bin that is adjacent to a bin that has been assigned to this dye to see if the bin has a count that is less than or equal to that of the assigned bin, but greater than some noise threshold. If the bin passes this test, it is assigned to the current dye. If the bin being checked has a count that is less than the adjacent non-assigned bin, the bin remains unassigned but marked as visited. This last case occurs when the density function has two peaks that are not totally separated in space. After all the bins are checked, the algorithm goes on to look for another peak and its associated bins, and changes the visited but not assigned labels back to "not visited".

Once all of the clusters have been assigned, the hue for each cluster must be determined from the density function for that cluster. The pixels that map to a given cluster are said to have similar hues; however, there is some variation in hue across the cluster, and hence, a single hue that will replace all of the similar hues must be determined. Since the number of bins that are associated with any cluster is expected to be greater than one, some mechanism must be defined for determining the hue that will be used to represent that dye in other computations and in enhanced displays. Each bin represents one hue value. In one aspect of the invention, the hue corresponding to the weight average of the bin hues is used, the average being weighted by the count for the bin in question. Alternatively, the hue corresponding to the bin having the maximum count could be utilized.

Once a hue is assigned to a cluster, the identity of the actual dye in the experiment that gave rise to pixels of that hue must be determined. The cluster assignments merely label all of the pixels corresponding to the color as having the same hue. While the present invention does not assume a hue for the dye, an actual dye must be associated with each of the determined hues. In one aspect of the invention, the hue associated with a cluster is compared with the range of hues observed for the specific dyes in other staining preparations and the dye whose hue most closely matches the determined hue for the cluster is assumed to be the dye that gave rise to that cluster.

The manner in which the dyes are unmixed will now be discussed in the case of a two dye staining system. Once the points in the hue space corresponding to each dye have been identified, a pair of corresponding unit vectors, $C_{D1}$ and $C_{D2}$ can be defined in the color space. These two vectors define a plane in the color space. Define a unit vector $C_N$ in the color space that is orthogonal to this plane. Any point in the color space can be written in terms of components along these three vectors. That is, $$I_P = I_1 C_{D1} + I_2 C_{D2} + I_3 C_N \quad (3)$$

If the point were purely a mixture of the two dyes and there was not noise, $I_3$ would be zero, and $I_1$ and $I_2$ would be greater than or equal to zero. If $I_1$ and $I_2$ are non-negative, it is assumed that the point is a mixture of the two dyes provided $$I_3 >> \sqrt{I_1^2 + I_2^2} \quad (4)$$

In this case, $I_3$ is a measure of the noise in the measurement. If $I_1$ or $I_2$ is negative, that intensity is set to zero before determining the values of the remaining intensities.

The above example utilized a system in which there were only two dyes. If there are three dyes, than there will be three cluster centers in the hue space and three corresponding unit vectors in the color space. The pixels in the color space can then be fit according to:

$$I_P = I_1 C_{D1} + I_2 C_{D2} + I_3 C_{D3} \quad (5)$$

where $C_{D1}$, $C_{D2}$, and $C_{D3}$ are the unit vectors in the color space corresponding to the three dyes, respectively. If any of the dyes have intensities less than zero, the intensity of that dye is set to zero and the intensities of the other dyes recomputed.

In one aspect of the present invention, the intensities of the measured pixels for each dyed region are used to compute the amount of dye in the sample at the corresponding point in the specimen. In one model, the amount of dye is proportional to the optical density (OD) of the pixel in the image corresponding to the point on the specimen. The OD associated with a given pixel having an intensity I is $-\log(I/I_0)$, where $I_0$ is the intensity of a reference pixel with no dye. Hence, it is advantageous to transform the pixel RGB values in the color space such that the intensities are replaced by the log of the current intensities before determining the intensities from the hue space cluster centers.

The above described embodiments utilize an image comprising an array of RGB pixels that is transformed into a two-dimensional hue binned array that is independent of the intensity of the RGB pixels. However, imaging systems that generate images having more color channels with each color channel representing an intensity in a predetermined band of wavelengths are known.

For example, in infrared imaging, spectral measurements at any number of wavelengths are measured for each point on a specimen to identify chemical components in the specimen. In one type of system, an infrared beam is focused to a point on the specimen and the amount of light that is reflected or transmitted is measured as a function of the wavelength of the incident light. One goal of such systems is to identify regions of similar chemistry on the specimen. If the specific chemical spectral signatures are not known or those signatures vary with preparation of the samples, an "untutored" clustering analysis can be used to enhance the specimen image to show regions of similar chemistry. Such an analysis is complicated by the different intensities in the reflected or transmitted light received by the detector. Hence, a system that transforms the image to one that does not depend on the intensity of the pixels simplifies the analysis.

In the more general case, the image pixels are points in an M dimensional space and are characterized by an intensity and a hue that has a dimension of M−1. The pixels in the M dimensional space are vectors that have components that represent the intensity of light in M different wavelength bands. The hue characterizes the color of the pixel. The hue could be represented by the angles that define the direction of vectors in the M dimensional space. The same clustering method could be applied to find clusters that are independent of the intensity of the image points. The M dimensional pixels would be transformed to bins in the M−1 dimensional hue space to provide a density distribution in the hue space. Any cluster finding algorithm that can operate on the resulting density distribution can then be applied to find the clusters corresponding to classes of pixels having similar hues.

While the angular representation used to generate the hue space is preferred, any transformation that provides an M−1 dimensional mapping in which points having different intensities in the M dimensional space are mapped to the same point in the M−1 dimensional space could be utilized provided no "hue information" is lost. That is, any two points in the M dimensional space that lie on different lines through the origin of that space must be mapped to two different points in the hue space, and any two points that lie on the same line through the origin in the M dimensional space must be mapped to the same point in the hue space. Such a transformation will be referred to as a hue mapping transformation. The term hue as defined herein is the M−1 dimensional vector in the hue space obtained by transforming each pixel in the M dimensional pixel space via a hue mapping transformation.

In the above-described embodiments, the entire image was processed at once by the data processing system. However, to determine the hues corresponding to each cluster of color pixels in the image, a subset of the pixels could be utilized. The subset could be chosen at random or by sub-regions of the image. The use of sub-regions can be advantageous in cases in which a first dye stains substantially more of the slide than a second one of the dyes. When the entire image is scanned, the cluster generated by the first dye will have many more points and may be broadened by slight variations in the hue of that dye over the slide resulting from variations in the underlying material to which the dye has attached. The tails of this broader cluster can obscure a small cluster related to another dye. By processing sub-regions separately, the spreading of the first dye cluster will be reduced, since the spreading due to variations in different parts of the slide will not be present. In addition, the amount of the second dye in one or more of the sub-regions relative to the first dye could be much greater than the average of the ratio of the two dyes over the slide. For example, the second dye could intensely stain small structures in regions that are distant from any structures stained by the first dye. The peak for the second dye may be more easily identified in such regions. Given the knowledge of the hue of the second dye generated from such regions, pixels that lie outside the peak for the first dye but at hues consistent with the second dye can now be assigned to the second dye. In one aspect of the invention, the user can view an image of the slide and indicate one or more regions to be separately processed.

As noted above, the computational reduction workload provided by the present invention allows the present invention to be implemented on a conventional workstation even without resorting to parallel processing code to decrease the processing time. However, the present invention is also well adapted for operation on a computer that has parallel processors, since the transformation of the RGB pixels to the points in the hue space can be performed in parallel, since the transformation of each pixel in the RGB space is independent of the other pixels. In addition, the transformation is a simple table lookup, and hence, can be run on the type of specialized processors in graphic processors developed for high speed optical processing that have thousands of processors and are relatively inexpensive.

In embodiments in which the user interacts with the data processing system to provide information about the threshold values or the dyes, the data processing system must include a user interface in addition to an interface for receiving the image to be processed. The user interface preferably includes a color display as well as an interface for the user to input data. FIG. 2 is a view of the image on the display of such an image processing system. In one embodiment, the computer is included in the display. Alternatively, a conventional computer with a separate display, processor and user interface can be used to implement the present invention.

The above-described embodiments process the entire image at one time. However, in some instances, it may be advantageous to process less than the whole image in determining the cluster centers. For example, if the first dye is only present in a small fraction of the pixels, while the second dye is present in a large area of the slide, the noise from the second dye may obscure the density peak of the first dye. In such a case, limiting the processing that provides the cluster centers to a region of the slide in which the first dye is present and the second dye is also present but with lower coverage, can provide a better estimate of the cluster center for the first dye.

While the method of the present invention allows a whole slide image having $10^{10}$ pixels to be used in determining the cluster centers, the processing time for such a large image may still present challenges. In such cases, it can be advantageous to determine the cluster centers using a randomly selected subset of the pixels in the image.

The present invention also includes a computer readable medium that stores instructions that cause a data processing system to execute the method of the present invention. A computer readable medium is defined to be any medium that constitutes patentable subject matter under 35 U.S.C. 101 and excludes any medium that does not constitute patentable subject matter under 35 U.S.C. 101. Examples of patentable media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method of operating a data processing system to automatically process a color digital image of a specimen that has been stained with a first dye and a second different dye, said method comprising:
    receiving said digital color image comprising a plurality of pixels, each pixel being characterized by a pixel vector having components determined by an intensity of light in each of a corresponding number of wavelength bands, each of said plurality of pixels corresponding to light leaving a corresponding point on said specimen in response to said specimen being illuminated;
    transforming a plurality of pixel vectors of said color digital image to a hue space divided into a plurality of bins using a transformation that is independent of said first and second dyes, each bin being characterized by a number of pixels that have been transformed into that bin;
    causing said data processing system to automatically find first and second clusters of bins in said hue space based on said numbers of pixels that were transformed into each of said bins, and to assign first and second vectors, respectively, corresponding to each of said clusters as first and second color vectors characterizing said first and second dyes, respectively, and
    causing said data processing system to determine a concentration of each of said dyes at points on said specimen from said first and second color vectors at pixels corresponding to said points on said specimen and said first and second color vectors.

2. The method of claim 1 wherein said plurality of bins is characterized by a number of bins, said number of bins being less than $10^4$.

3. The method of claim 1 wherein said plurality of bins is characterized by a number of bins, said number of bins being less than $10^6$.

4. The method of claim 2 wherein said number of pixels comprises substantially all of said color digital image.

5. The method of claim 1 wherein said plurality of pixels are from a sub-region of said color digital image.

6. The method of claim 1 wherein said plurality of pixels are chosen at random from said color digital image.

7. The method of claim 1 wherein transforming said plurality of pixel vectors comprises using a transformation matrix that assigns a corresponding one of said bins to each possible pixel vector.

8. The method of claim 1 further comprising determining a relative concentration of said first and second dyes in a point on said specimen utilizing said first and second color vectors.

9. The method of claim 1 wherein said data processing system utilizes a threshold value in finding said first and second color vectors and wherein said threshold value is set by a user of said data processing system.

10. The method of claim 9 wherein said data processing system displays information about said first and second colors to said user for approval by said user.

11. The method of claim 1 wherein said data processing system utilizes a predetermined region of said hue space in finding said first color vector.

12. A computer readable medium comprising instructions that cause a data processing system to execute a method for automatically processing a color digital image of a specimen that has been stained with a first dye and a second different dye, said method comprising:
- receiving said digital color image comprising a plurality of pixels, each pixel being characterized by a pixel vector having components determined by an intensity of light in each of a corresponding number of wavelength bands, each of said plurality of pixels corresponding to light leaving a corresponding point on said specimen in response to said specimen being illuminated;
- transforming a plurality of pixel vectors of said color digital image to a hue space divided into a plurality of bins using a transformation that is independent of said first and second dyes, each bin being characterized by a number of pixels that have been transformed into that bin;
- causing said data processing system to automatically find first and second clusters of bins in said hue space based on said numbers of pixels that were transformed into each of said bins, and to assign first and second vectors, respectively, corresponding to each of said clusters as first and second color vectors characterizing said first and second dyes, respectively, and
- causing said data processing system to determine a concentration of each of said dyes at points on said specimen from said first and second color vectors at pixels corresponding to said points on said specimen and said first and second color vectors.

13. The computer readable medium of claim 12 wherein said plurality of bins is characterized by a number of bins, said number of bins being less than $10^4$.

14. The computer readable medium of claim 12 wherein said plurality of bins is characterized by a number of bins, said number of bins being less than $10^6$.

15. The computer readable medium of claim 12 wherein said plurality of pixels are from a sub-region of said color digital image.

16. The computer readable medium of claim 12 wherein transforming said plurality of pixel vectors comprises using a transformation matrix that assigns a corresponding one of said bins to each possible pixel vector.

17. The computer readable medium of claim 12 further comprising determining a relative concentration of said first and second dyes in a point on said specimen utilizing said first and second color vectors.

18. The computer readable medium of claim 12 wherein said data processing system utilizes a threshold value in finding said first and second color vectors and wherein said threshold value is set by a user of said data processing system.

19. The computer readable medium of claim 18 wherein said data processing system displays information about said first and second colors to said user for approval by said user.

20. The computer readable medium of claim 12 wherein said data processing system utilizes a predetermined region of said hue space in finding said first color vector.

* * * * *